United States Patent [19]

Castagna et al.

[11] Patent Number: 4,701,891
[45] Date of Patent: Oct. 20, 1987

[54] METHOD AND APPARATUS FOR MEASURING FORMATION COMPRESSION AND SHEAR WAVE VELOCITY

[75] Inventors: John P. Castagna, Plano; Robert W. Siegfried, II, Frisco, both of Tex.

[73] Assignee: Atlantic Richfield Company, Plano, Tex.

[21] Appl. No.: 828,905

[22] Filed: Feb. 13, 1986

[51] Int. Cl.$^4$ .......................... G01V 1/00; G01V 1/28
[52] U.S. Cl. ..................................... 367/31; 364/422; 367/35; 367/29
[58] Field of Search .................... 364/422; 367/25, 27, 367/29, 31, 34, 35, 57, 75

[56] References Cited

U.S. PATENT DOCUMENTS

| 3,330,375 | 7/1968 | White | 367/75 X |
| 4,262,545 | 4/1981 | Lamarche et al. | 367/117 X |
| 4,316,267 | 2/1982 | Ostrander | 367/74 X |
| 4,437,176 | 3/1984 | Mack | 367/56 X |
| 4,534,019 | 8/1985 | Wiggins et al. | 367/75 |
| 4,562,556 | 12/1985 | Ingram et al. | 367/26 |
| 4,562,557 | 12/1985 | Parks et al. | 367/75 X |

Primary Examiner—Thomas H. Tarcza
Assistant Examiner—Tod R. Swann
Attorney, Agent, or Firm—F. Lindsey Scott; James C. Fails

[57] ABSTRACT

Method and apparatus for measuring formation compressional and shear wave velocities characterized by a downhole tool having an attenuation chamber between a transmitter and a receiver and a plurality of receivers spaced from the transducer so as to discriminate through the amplitude of the reflected compressional wave the critical angles for the respective formation compressional and shear wave velocities, thereby determining the formation compressional and shear wave velocities. Also disclosed are preferred embodiments in which the plurality of connectors connected between the receivers are also connected with a recorder for recording gated time interval signals. A discriminator and gate are provided for discriminating the largest amplitude of received acoustic energy signals received during the gating period.

In a preferred embodiment, a microprocessor is also employed to calculate the density from the compressional velocity and the normal incidence reflection coefficient and arrange for displaying the compressional wave velocity, the shear wave velocity and the density as a function of depth.

5 Claims, 17 Drawing Figures

CRITICAL ANGLE VERSUS FORMATION VELOCITY

METHOD AND APPARATUS FOR MEASURING FORMATION COMPRESSION AND SHEAR WAVE VELOCITY

FIELD OF THE INVENTION

This invention relates to acoustic well logging. More particularly, this invention relates to a system for measuring the formation compressional and shear wave velocities and facilitating the calculation of densities in a borehole penetrating subterranean formations, the system using reflected acoustic signals.

BACKGROUND OF THE INVENTION

Conventional sonic logging devices measure the velocity of critically refracted compressional and shear waves in the formation and date back to the Vogel article "A Seismic Logging Method," GEOPHYSICS, v.17, number 3, July, 1952 and U.S. Pat. No. 2,651,027. There are other treatments of this tech5 nology such as "Elastic Waves in Layered Media"; Ewing, W. M., Jardetzky, W. S. and Press, F., 1957, McGraw-Hill. Also discussed in conventional technology was a "borehole televiewer" (Zemanek, J., et al, 1969 "The Borehole Televiewer: A New Logging Concept for Fracture Location, and "Other Types of Borehole Inspection," J. Petr. Tech., v. 21, pp. 762-774 in 1969) that obtained an acoustic reflectance image of the borehole wall at normal incidence.

Other treatices include Stoll, R. D. and Kan, T. K., 1981, "Reflection of Acoustic Waves at a Water-Sediment Interface," J. ACOUST. SOC. AM., v. 70, no. 1.

None of the prior art approaches however, facilitated measuring formation compressional and shear wave velocity from reflected acoustic signals. Neither did they make possible the calculation of the densities of the respective formations penetrated by the borehole at their respective depths using reflected acoustic signals.

While the prior art has provided method and apparatus for obtaining refracted acoustic signals from which compressional-wave and shear-wave velocity can be calculated, the resolution of these devices is on the order of feet. In contrast, the use of reflected signals by the method described herein can provide resolution on the order of inches. This is accomplished with a continuously moving sonde which is not required to make contact with the borehole wall, thereby facilitating the logging operations.

Particularly, the prior art has not provided a method and apparatus for measuring both compressional and shear wave velocities and providing data from which densities of the subterranean formations could be calculated, both using acoustic energy, without requiring advent to more exotic forms of logging, such as nuclear magnetic resonance logging or gamma ray excitation logging.

SUMMARY OF THE INVENTION

Accordingly, it is an object of this invention to provide a method and apparatus that enables measuring velocities of both compressional and shear waves in most formations and enabling calculating shear wave velocity even in slow formations in which refracted shear waves do not exist.

Specifically, it is an object of this invention to overcome the deficiencies of the prior art and provide a simple economical method employing only acoustic energy and measuring compressional and shear wave velocities of the formation and providing data from which the density can be calculated.

These and other objects will become apparent from the descriptive matter hereinafter, particularly, when taken into conjunction with the appended drawings.

In accordance with one embodiment of this invention there is provided apparatus for measuring formation compressional and shear wave velocities comprising:

a. a downhole tool suspended eccentrically in a borehole and having at least one transducer for transmitting acoustic energy responsive to a signal and a zero offset receiver for showing zero offset time of transmission of the acoustic energy; a plurality of receivers disposed a plurality of respective predetermined distances from the transmitter in a first direction for receiving transmitted and reflected acoustic energy and capable of showing the amplitude thereof; and a mud velocity and attenuation chamber between and in communication with at least one transmitter and a receiver for measuring fluid acoustic energy transmission characteristics, including at least velocity and attenuation; the tool having at least two feet separating the most remote receiver from the transmitter;

b. a plurality of conductors connected with, respectively, with the at least one transmitter and the receivers for transmitting signals indicating transmission and receptions of acoustic energy;

c. a recorder connected with the conductors from the transmitter and receivers;

d. an energizer connected with the conductor to the transducer and connected so as to energize the transducer for transmission of acoustic energy;

e. gating means for gating the receivers to listen for predetermined interval after time zero; and f. discriminating means for discriminating the receiver indicating the largest amplitude arriving reflected acoustic signal; thereby indicating the critical angles and therefore the compressional velocity and the shear wave velocity for the formation at the indicated depth of the tool.

In a particularly preferred embodiment a microprocessor is also connected into the discriminating means with a display means for displaying compressional velocity and shear wave velocity as well being programmed to calculate and display the density of the formation as a function of the depth.

In accordance with another embodiment of this invention there is provided a method for measuring compressional and shear wave velocities including:

a. moving along a borehole penetrating formations at indicated depths, a tool that is eccentrically suspended within the borehole, the tool having at least one transducer for transmitting acoustic energy responsive to a signal and a zero offset receiver; a plurality of receivers disposed a plurality of respective distances from the transmitter in a first direction for receiving transmitted and reflected acoustic energy and capable of showing the amplitude thereof; and a mud velocity and attenuation chamber between and in communication with the at least one transmitter and a receiver for measuring fluid acoustic energy transmission characteristics, including at least velocity and attenuation; the tool having at least two feet distance separating the transmitter from the most remote receiver;

b. discriminating the receiver receiving the largest amplitude signal of the reflected acoustic energy and thereby discriminating critical angles and, hence, the compressional and shear wave velocities for the formation and displaying the compressional and shear wave velocities as a function of depth; and calculating formation density for each set of compressional and shear wave velocities and displaying the density as a function of depth.

In the preferred embodiment of both method and apparatus, the transducer serving as a transmitter also serves as a zero time offset receiver that is connected with the recorder and the gating means for indicating zero offset time, which may be combined with the measured acoustic velocity of the mud to yield the distance from the tool to the borehole wall.

BRIEF DESCRIPTION OF THE DRAWINGS

FIG. 2 is a top view showing the tool suspended eccentrically in the borehole in accordance with the embodiment of FIG. 1a.

DESCRIPTION OF PREFERRED EMBODIMENTS

This invention can be employed in well logging for measuring the compressional and shear wave velocities of subterranean formations as a function of depth. This invention also enables calculating the density of the formation as a function of depth to assist in determining whether or not the formation is likely to contain a hydrocarbonaceous material such as oil or gas. This is particularly useful when correlated with other types of geologic information; such as, sampling of the core samples, seismic data or the like.

Figure 1A:
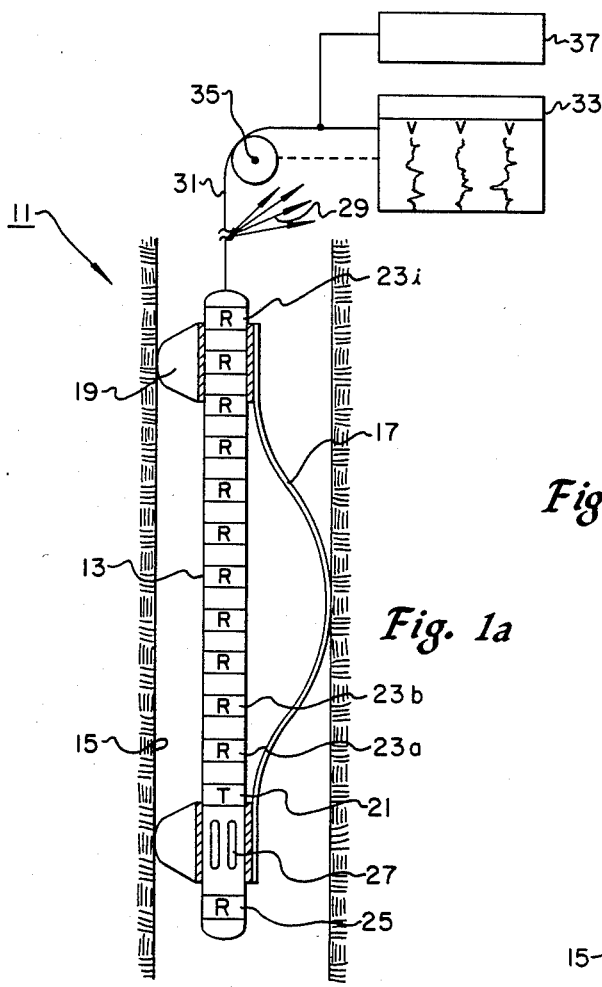
FIG. 1a is a partial side elevational view, partly schematic, illustrating a tool suspended eccentrically within a borehole in accordance with one embodiment of this invention.
Figure 1B:
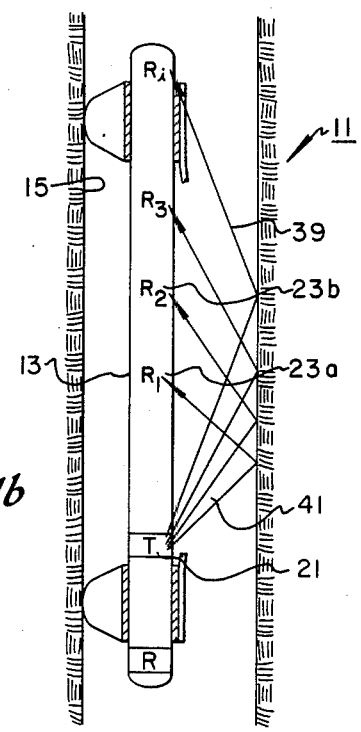
FIG. 1b is a schematic illustration showing ray path transmission of acoustic energy from the transmitter to a plurality of receivers.
Figure 1C:
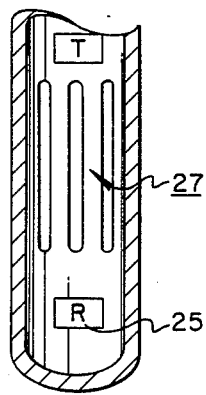
FIG. 1c is a partial sectional illustration showing the transmitter and receiver in the mud velocity sample chamber on the other side of the transmitter.

Referring to the Figures and particularly, FIGS. 1a, b and 2, the apparatus 11 for measuring formation and compressional and shear wave velocities comprises the downhole tool 13 suspended eccentrically in a borehole 15. The tool 13 is held eccentrically mounted by way of a bow spring 17 and shorter stand-offs 19, FIG. 1a. Disposed interiorly of the tool are at least one transducer 21 serving as at least a transmitter and a plurality of receivers $23a,-23i$, disposed uphole from the transducer in the illustrated embodiment. In the illustrated embodiment of FIG. 1b the transmitter-transducer 21 also serves as a zero offset receiver. In FIG. 1c another transmitter T and receiver 25 are disposed on the opposite sides of a mud velocity sampler, or mud velocity attenuation chamber 27. A plurality of conductors 29 are disposed interiorly of a coaxial cable 31 that traverses downwardly interiorly of the wellbore and along or as a part of the suspending line holding the tool 13 suspended in the wellbore. The conductors are connected with the respective receivers and the transducer and with a recorder 33 that has paper moved responsive to a depth indicator 35. An instrumentation package 37 is provided. The instrumentation package contains an energizer for energizing the transducer and is connected by way of its conductor with the transducer for transmitting acoustic energy. The instrumentation package 37 also has a gating means for gating receivers to listen for a differential time after time zero and for a duration of $\Delta t$. The instrumentation package 37 also includes a discriminating means for discriminating the receiver indicating the largest amplitude signals indicative, respectively, of the arriving reflected acoustic energy at the respective receivers so as to pick the critical angles and hence the velocities of the compressional wave and the shear wave arriving at the respective receivers. The respective recorders, depth measuring means, discriminating means, gating means and the like are conventional, as illustrated by U.S. Pat. No. 2,956,634, Zemanek, Jr. et al "System for Acoustic Pulse Frequency Logging." If desired, the transducer 21 may be connected with a first channel that includes a pulse power source for serving to emit or transmit the acoustic energy and to a second channel to serve as a receiver for a measuring system. Thus the pulse power would be applied to the transducer 21 repeatedly to energize it in the transmitter mode to produce sharp, time-spaced acoustic pulses.

Figure 2:
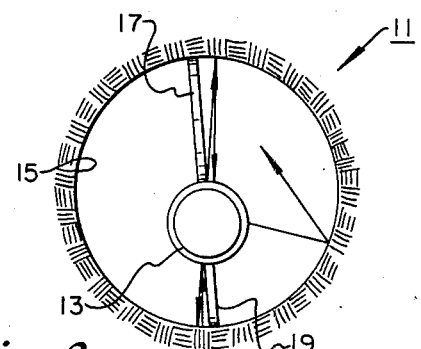
Figure 3A:
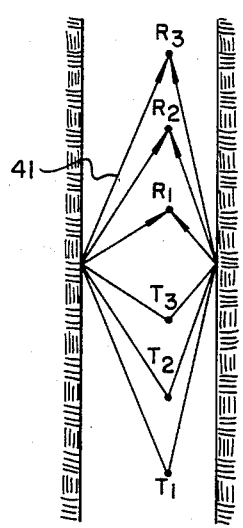
FIG. 3a is a schematic illustration of ray path transmissions of acoustic energy from both far side and near side reflected walls of the borehole from a transmitter to a plurality of receivers, where the transmitter is moved to a plurality of locations.
Figure 3B:
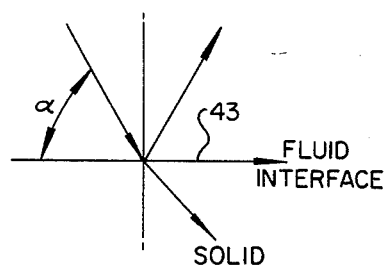
FIG. 3b is a schematic illustration of the theoretical and empirical relationship in which reflectances at critical angles coinciding with the interface maximize the reflected energy received by a receiver.
Figure 14:
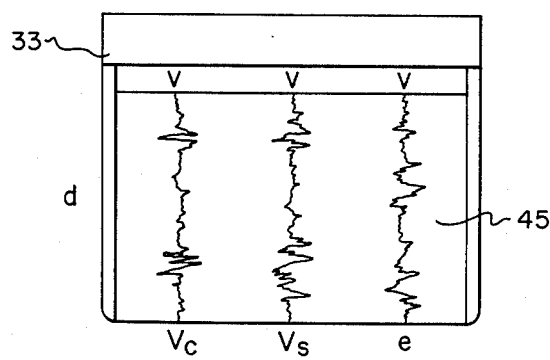
FIG. 14 is a schematic illustration of a typical display means such as a pin type recorder with paper being moved past the pins for recording the compressional wave velocity Vc and the shear wave velocity Vs and the density p.

The acoustic energy from the transmitter travels to the receivers by way of the fluid to at least the interface with adjacent formations where a part is reflected back and a part travels through the formations. This may be understood more nearly completely by referring to the FIGS. 1b, 2, 3a and 3b. Specifically, reflected acoustic energy follows essentially a ray path as illustrated by the respective ray paths 39, FIG. 1b and drawn from the transmitter 21 to the respective receivers 23a, b etc. As illustrated in FIG. 2, the ray paths preferably traverse to the borehole wall and back, illustrated by the ray paths 41, FIG. 1b and 3a. Decentering results in preferably receiving reflected acoustic energy via the longest or the shortest ray paths. If desired, collimation can be employed to determine a major path of sound travel. As can be appreciated, each of the receivers R1, R2 and R3 in FIG. 1b and the locations R1, R2 and R3 in FIG. 3a represent respective angles from the transmitter to the receiver such that the largest amplitude will be indicative of the critical angle, shown by the angle alpha in FIG. 3b made with the interface line 43 at greatest reflection.

The fundamental data acquired by the tool will be acoustic amplitude as a function of source-receiver offset for reflections from the near and/or far walls of the borehole. By suitably combining data acquired at various tool depths, this multiple offset data may be gathered for a single reflection point as illustrated in FIG. 3a. The distance of the tool from the near and far walls may be calculated by combining the zero-offset travel time measured by the transmitting/receiving transducer with mud velocity measured in the tool through the mud velocity chamber 27. With this information, source-receiver offset distance may be converted to incident angle for each reflection path. By knowing the diameter of the hole to be logged, the respective receivers can be equated directly to incident angles and the reflection amplitude versus the incident angle thus measured directly by the discriminating means discriminating the amplitude of the received signals.

Figure 4:
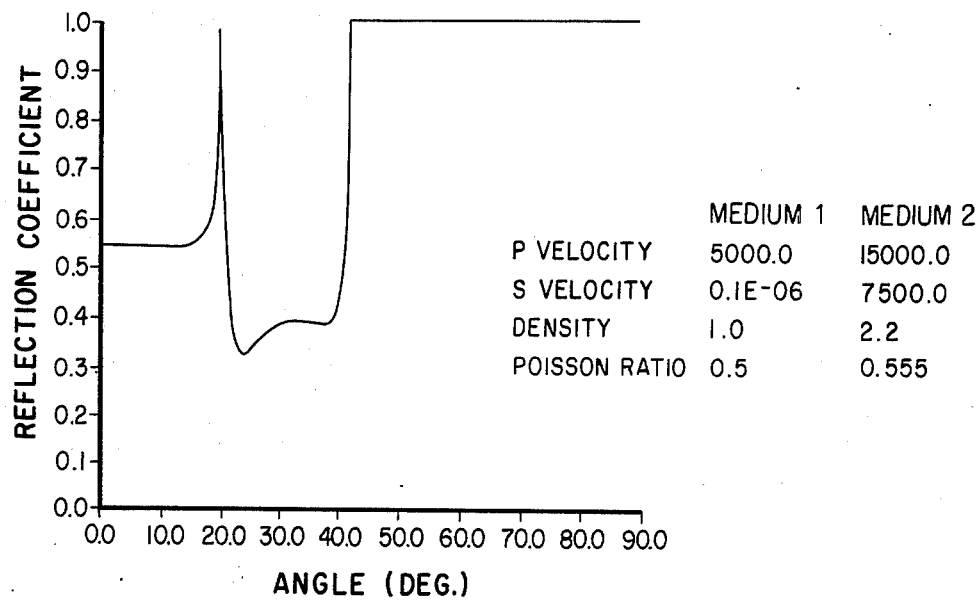
FIG. 4 is a plot of the theoretical relationship showing reflection coefficient versus the incident angles in degrees (DEG.) and peaks or valleys which are determinative of the critical compressional wave and shear wave velocities of the formation.

At incident angles corresponding to the compressional and shear wave critical angles, reflection amplitude maxima will occur, as illustrated in the theoretical curve of FIG. 4. This curve is derived from the Knott-Zoeprittz equations. Thus the respective receivers and their respective amplitudes measure the compressional and shear wave critical angles and, hence, the velocity at each critical angle. The compressional and shear velocities are related to the critical angles by formula I, known as the Snell formula:

$$V = \frac{V_f}{\sin \theta_c}, \qquad (I)$$

where $V_f$ is a measured fluid velocity
V is the compressional shear wave velocity
$\theta$ is the corresponding critical angle.

Figure 5:
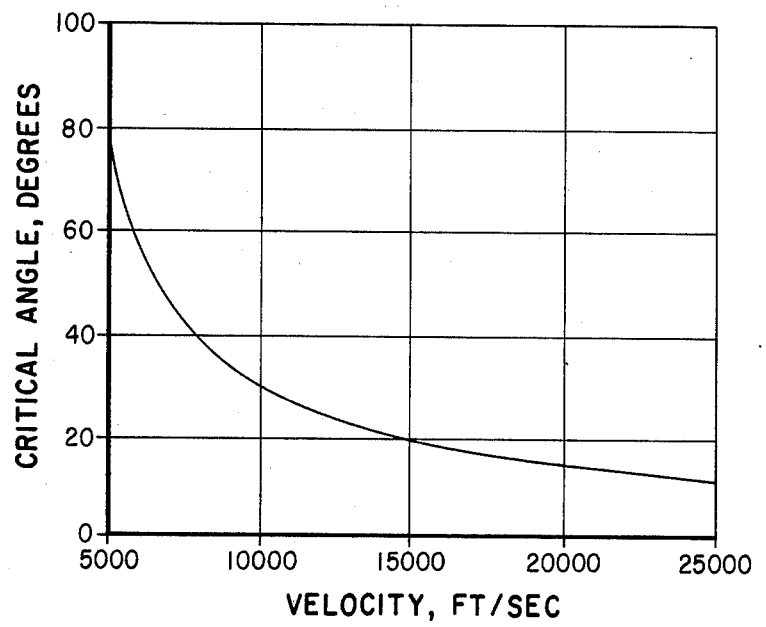
FIG. 5 is a plot of the critical angle in degrees versus the velocities in feet per second for formation velocity, indicating that once the critical angle is determined, the velocity is thus known.
Figure 6:
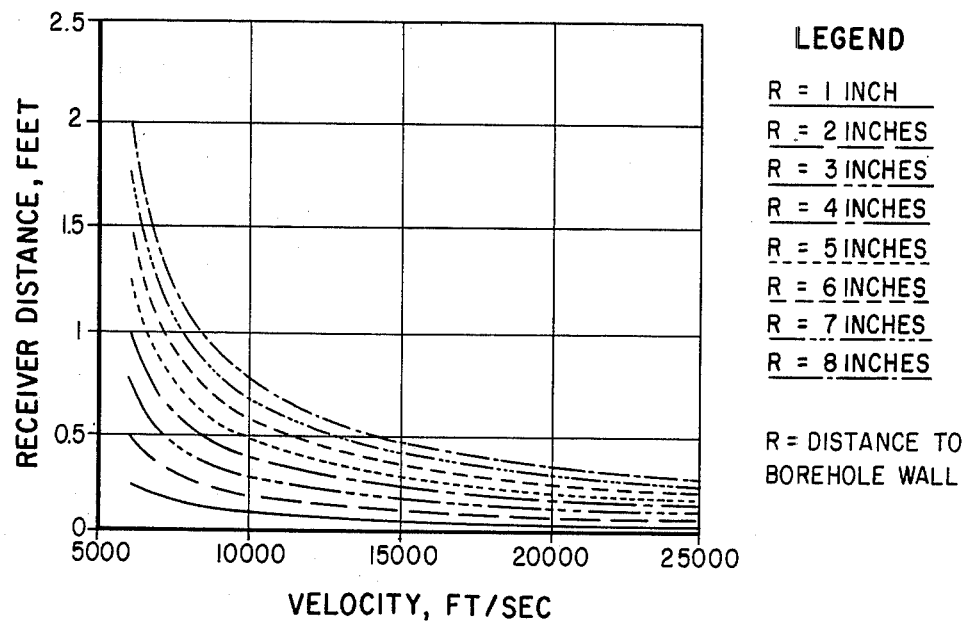
FIG. 6 is a plot of the receiver distance in feet at which maximum amplitude is achieved versus the acoustic velocity in feet per second.

FIG. 5 shows the critical angle versus formational velocity, compressional or shear wave. The variation of critical angle versus velocity, and thus the sensitivity of the method, is greatest at low velocities but still adequate at high velocities. As shown in FIG. 6, a maximum source-receiver distance of two feet should be adequate to enable obtaining critical reflections at reasonable distances from the borehole wall. Since the reflection arrival times are known, it is a simple matter to gate open the geophones and recorder for a window of time for receiving the acoustic signals to measure the reflection amplitude.

The discriminating means can operate on analogue principle or it can, preferably, employ an analogue-to-digital converter such that the digital representations of the maximum can be picked more easily by the discriminating means for measurement of the maximum amplitude receiver and, hence, measure the critical angles of the respective arriving acoustic waves, compressional and shear.

Figure 7:
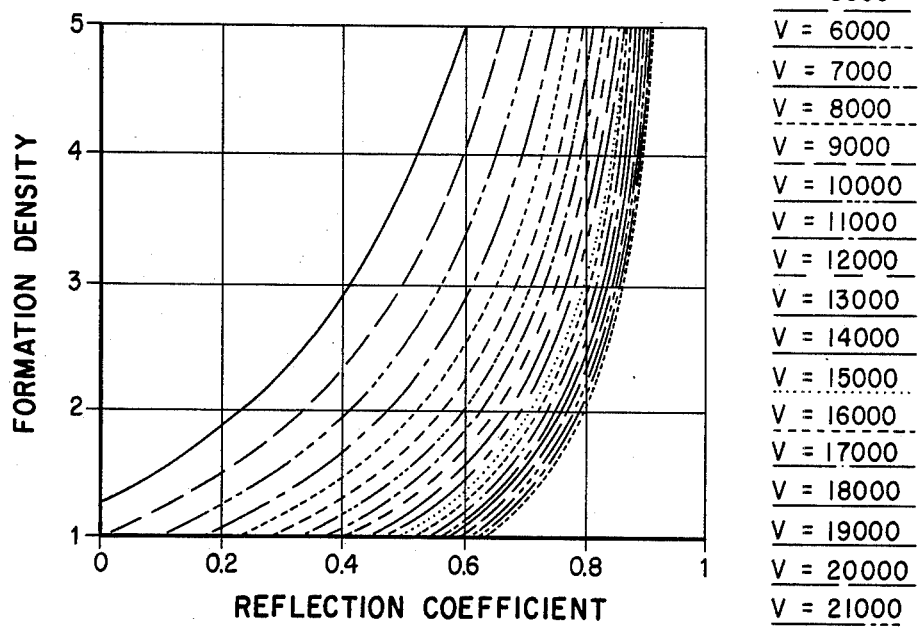
FIG. 7 is a plot of formation density versus reflection coefficient.

Preferably a microprocessor is employed in the discriminating means and in the instrumentation package to enable also calculating density of the formation in accordance with formula 11 hereinafter.

$$R = \frac{A_R}{A_I} = \frac{\rho V_p - \rho_f V_f}{\rho V_p + \rho_f V_F} \qquad II$$

where:
$A_R$ is reflection amplitude
$A_I$ is incident amplitude
$V_f$ is again the borehole fluid density
$\rho f$ is the fluid density
$V_P$ is the formation compressional velocity
$\rho$ the formation density Since $V_p$, $V_f$ may be determined from measurements from the proposed tool and pf is typically known, $\rho_F$ may be calculated from R, R being the reflection coefficient. $A_R$ can be determined from the zero offset reflection amplitude corrected for divergence and attenuation; however, without knowledge of $A_I$, only changes in the density will be determined. With $A_I$ being determined through calibration in a medium of known density, an acoustic density log can be calculated. FIG. 7 shows the relationship between the formation density and the reflection coefficient.

Depending upon the range of offsets used and the degree to which the tool axis is displaced from the borehole axis, the near and far wall reflections may arrive at certain receivers contemporaneously and interfere. This problem may be solved by radiating acoustic energy toward only half the borehole circumference through the aforementioned collimators, and selecting only the near wall or the far wall reflection exclusively.

Figure 8:
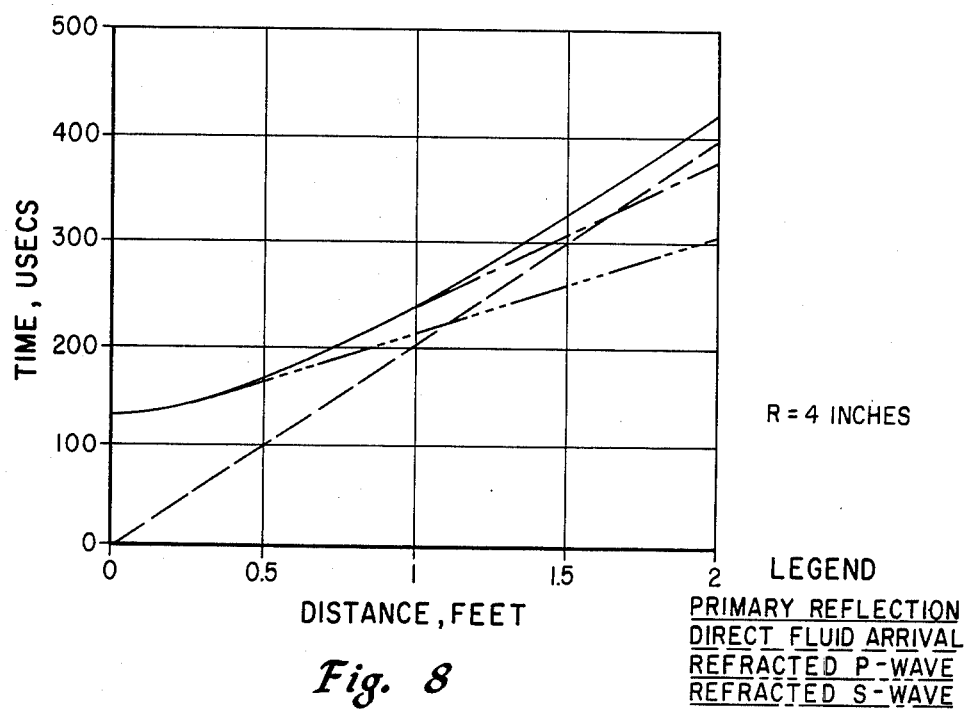
FIG. 8 is a plot of the time in microseconds as a function of the distance in feet for indicating the times the gating means should keep the respective receivers open for listening.

As illustrated in FIG. 8, the primary reflection is not the first arrival at the respective receivers, being preceded by the direct fluid arrival and possibly, the refracted compressional and shear waves. This can result in distortion of the amplitude versus offset curve if the various arrivals interfere with each other. This problem may be avoided by using directional receiver transducers oriented to discriminate against arrivals with angles of incidence different from the reflected P-wave. In addition, full wave form recording allows the application of digital signal processing techniques such as FK-filtering and Tau-P analysis to separate the events.

Figure 9:
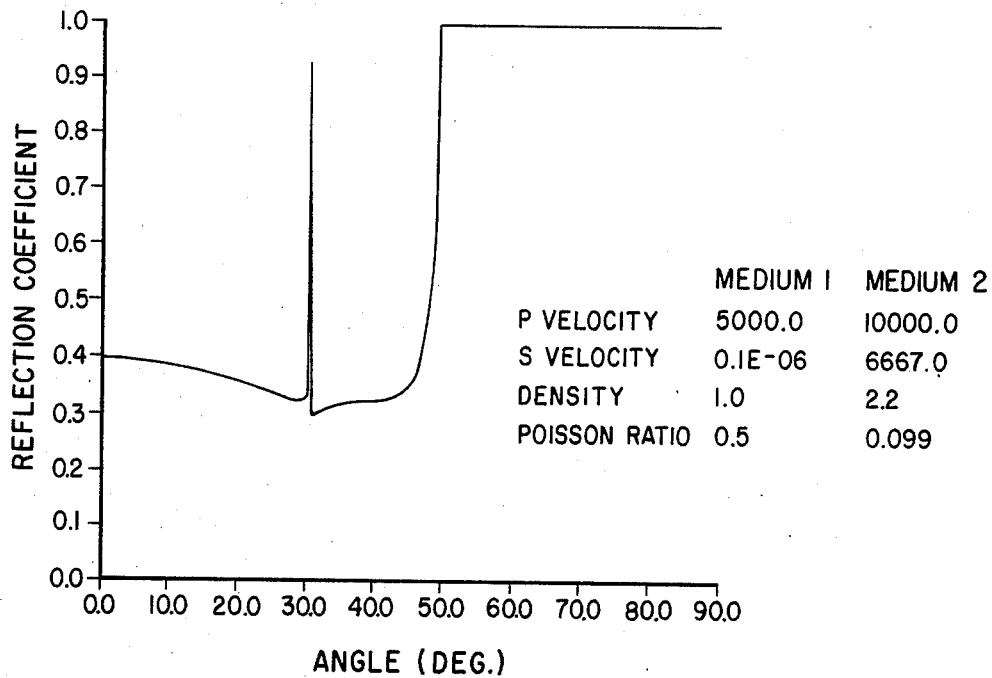
FIG. 9 is a plot of the reflection coefficient versus the incident angle showing the peaks at the critical angles for, respectively, compressional and shear wave arrivals.
Figure 10:
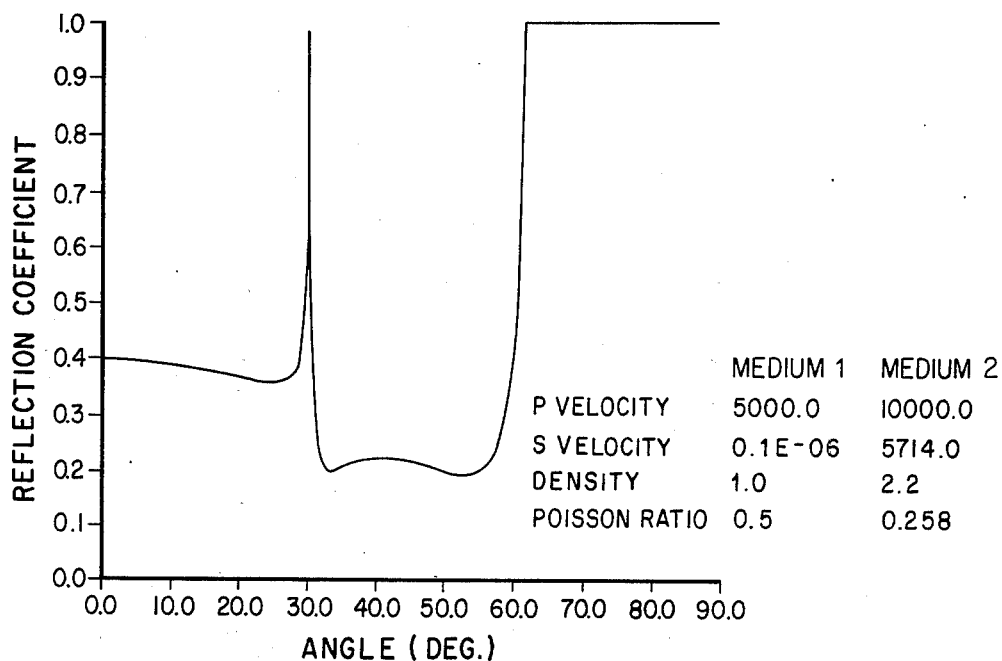
FIG. 10 is similarly a plot of reflection coefficient versus incident angle for a formation having a lower shear wave velocity.
Figure 11:
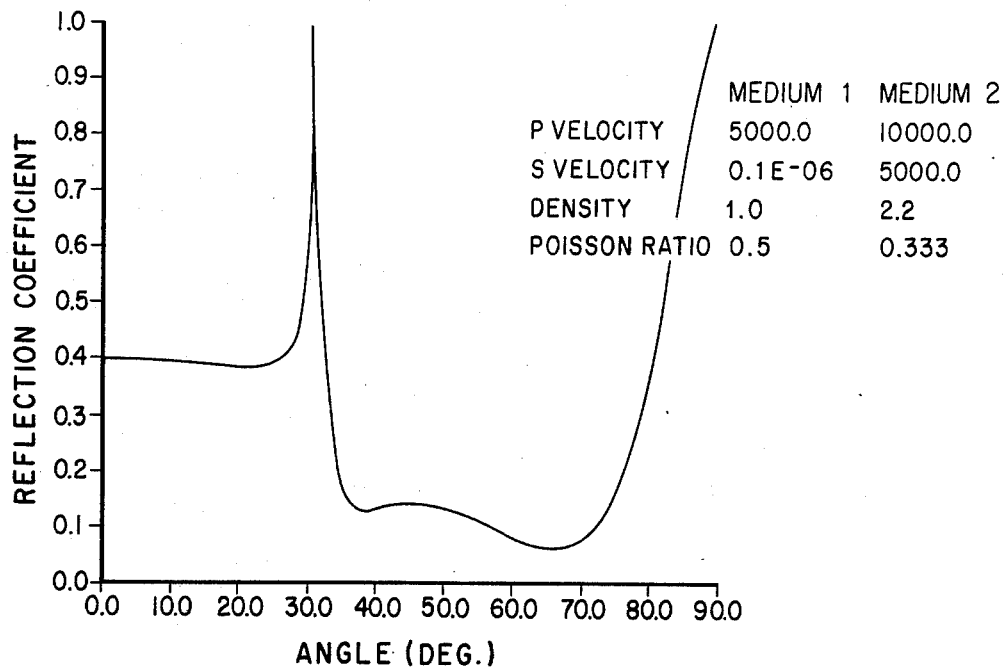
FIG. 11 is a plot of reflection coefficient versus incident angle for a formation having a still lower shear wave velocity.
Figure 12:
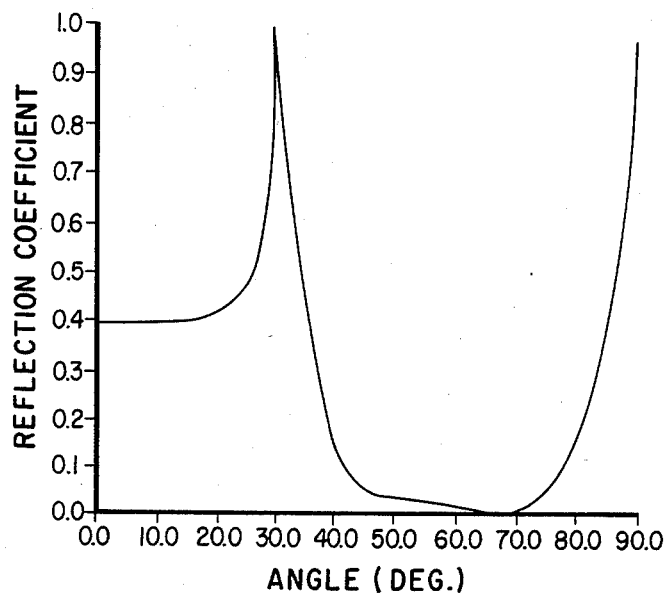
FIG. 12 is a plot of reflection coefficient versus incident, angle.
Figure 13:
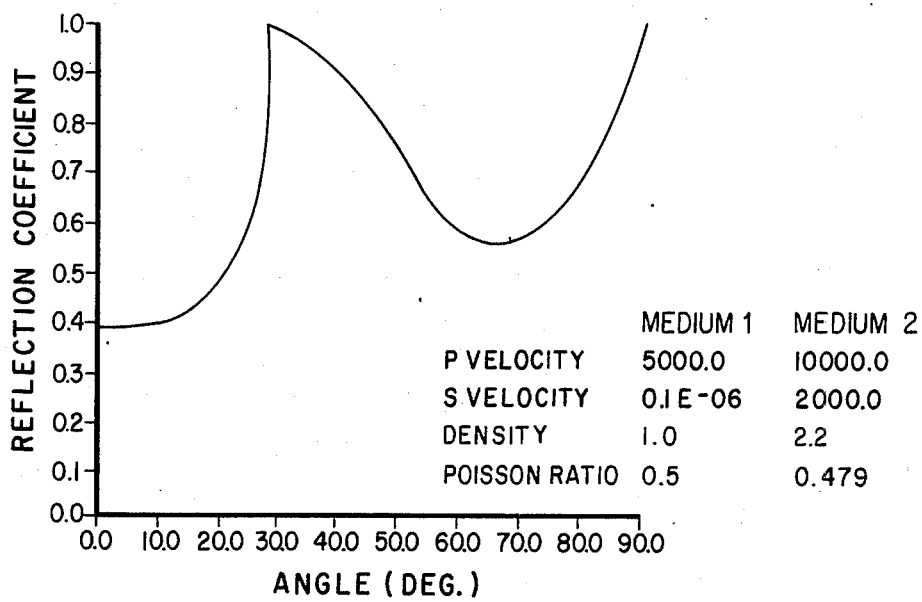
FIG. 13 is a plot of reflection coefficient versus incident angle.

FIGS. 9 through 14 show the effect of changing shear wave velocity on the reflection coefficient versus incident angle curve. In FIG. 9, the formation compressional and shear wave velocities are both higher than the fluid velocity. In this situation there are critical angles at 30° and 49°. Beyond the second critical angle there is a total internal reflection and the reflection coefficient is unity. Thus, wide angle reflections may be used to calibrate the reflection coefficients in such high velocity formations. In FIG. 10, there is illustrated the fact that a decrease in shear velocity of 14% results in an increase in critical angle of 1% as the shear wave velocity drops from 6667 feet per second to 5714 feet per second. Referring to FIG. 11, there is illustrated the fact that the shear wave velocity decreases by another 12.5% from 5714 to 5000 feet per second, the critical angle increases by almost 50% to about 90%. Thus, for low shear wave velocity slightly greater than the fluid velocity, where conventional sonic tools have great difficulty measuring shear velocity, this invention is extremely sensitive. Furthermore, as a given strata has a shear wave velocity below the fluid velocity the shape of the reflection coefficient versus the incident angle curve changes dramatically. Thus, shear wave velocities can be extracted with ease by inversion.

Implicit in this invention is the potentiality of determining formation permeability, since the shape of the reflection coefficient versus the angle of incidence curve is related to permeability.

In operation, the tool 13 is moved along the borehole 15 with its axis displaced from the borehole central longitudinal axis, in order to restrict the received energy to the specular reflections from narrow regions around one or both of the near and far walls of the borehole, as illustrated in FIG. 2. This mode of operation will greatly reduce the dependence of received acoustic amplitudes upon tool position within the borehole, and allow the tool to accurately characterize the acoustic reflectivity of the borehole wall as a function of incident angle.

Specifically, the receiver within a certain range of offsets with the amplitude that is greatest corresponds to, or determines, the critical angle and velocity for the compressional wave. Similarly, the receiver within a further range of offsets with the greatest amplitude will determine a second critical angle and hence the velocity for the shear wave. Both amplitude maxima are monitored during the time window when the receivers are listening for the reflected acoustic energy. The discriminator means discriminates the receiver having the maximum amplitude and, hence, discriminates the critical angle and consequently the velocity, as shown in FIG. 5. This measurement is subject to direct automation and need not require the use of a microprocessor. Preferably, however, a microprocessor is employed so that useful information can be calculated when the signal is weak, and to obtain shear wave velocity when the second critical angle is not achieved from the shape of the reflection coefficient versus offset curve. Specifically, it is within the skill of the art to program a microprocessor to enhance received information, and to automatically analyze curve shape to determine, automatically, shear wave velocity. Moreover, the microprocessor in accordance with a predetermined program to employ formula II enables calculating the density.

The recorder 33 as illustrated in FIG. 15 can record directly $V_c$ and $V_s$, the compressional and shear wave velocities, and through the processing by the microprocessor also record the density $\rho$ as a function of depth along paper 45 being moved through the recorder.

From the foregoing it can be seen that this invention accomplishes the objects delineated hereinbefore and even more. Specifically, this invention has several advantages as follows:

1. This invention is superior to conventional sonic logging in providing much higher resolution than conventional sonic logging. This is related to the size of the illuminated Fresnel zone on the borehole wall which is a function of the frequency of the signal. Resolutions on the order of one inch are obtainable by this invention whereas conventional sonic devices have resolutions on the order of two feet.

2. This invention eliminates cycle-skipping problems associated with the first break detection of the prior art type of conventional sonic logging, since this method depends on finding maxima at known arrival times.

3. This invention provides shear wave velocity information without the necessity of recording full wave forms and later digital processing or other exotic supplemental tools. This enables logs to be provided in real time in the field.

4. This invention allows obtaining shear wave velocity in slow formations. When shear wave velocity is slightly greater than fluid velocity the technique is very sensitive whereas conventional techniques suffer from severe noise problems. When shear velocity is less than fluid velocity and conventional techniques fail, shear velocity is still obtainable from the shape of the amplitude versus angle of incidence curve. Such amplitude versus angle of incidence curve is provided from complete recording information rather than from pens such as illustrated in FIG. 15 displaying shear wave velocity directly.

5. This invention allows acoustically measuring density of subterranean formations at respective depths.

6. This invention provides amplitude versus angle of incidence information which is related to formation permeability so as to allow calculation of formation permeability.

Although this invention has been described with a certain degree of particularity, it is understood that the present disclosure is made only by way of example and that numerous changes in the details of construction and the combination and arrangement of parts may be resorted to without departing from the spirit and the scope of the invention, reference being had for the latter purpose to the appended claims.

What is claimed is:

1. Apparatus for measuring formation compressional and shear wave velocities comprising:
   a. a downhole tool suspended eccentrically in a borehole and having:
      i. at least one transducer for transmitting acoustic energy responsive to a signal and a zero-offset receiver for showing zero offset time of transmission of said acoustic energy;
      ii. a plurality of receivers disposed at a plurality of respective predetermined distances from said transmitter in first direction for receiving transmitted and reflected acoustic energy and capable of showing the amplitude of the received acoustic energy,; and
      iii. a mud velocity and attenuation chamber between and in communication with said at least one transducer and receiver for measuring fluid acoustic energy transmission characteristics, including at least velocity and attenuation;
      said tool having at least two feet separating said at least one transducer and the receiver farthest therefrom;
   b. a plurality of conductors connected respectively with said at least one transducer and said receivers for transmitting signals indicative of transmission and reception of acoustic energy by respective transducer and receivers;
   c. a recorder connected with at least said conductors;

d. an energizer for energizing said transducer and connected with at least said conductor to said transducer;

e. gating means for gating said receivers to listen for a time interval after time zero; and f. discriminating means for discriminating the receivers indicating the largest amplitudes of arriving reflected acoustic energy;

thereby indicating the critical angles and therefore the compressional wave velocity and the shear wave velocity for the formation at the depth of the tool.

2. The apparatus of claim 1 wherein said transducer is a transducer that also serves as a receiver so as to serve as said zero-offset receiver; said transducer being connected with said recorder and said gating means for both transmitting acoustic energy and indicating zero time.

3. The apparatus of claim 1 wherein said discriminating means includes a microprocessor and said microprocessor is connected with a display means for displaying the compressional velocity and the shear wave velocity.

4. The apparatus of claim 3 wherein said microprocessor is also programmed to calculate the density as a function of depth and has a display means for displaying said density as a function of depth.

5. The method for measuring formational compressional shear wave velocities comprising the steps of:

a. moving along a borehole penetrating subterranean formations at indicated depths a tool that is eccentrically suspended within the borehole and having:

i. at least one transducer for transmitting acoustic energy responsive to a signal and a zero-offset receiver for showing zero time of transmission of said acoustic energy;

ii. a plurality of receivers disposed at a plurality of respective predetermined distances from said transmitter in first direction for receiving transmitted and reflected acoustic energy and capable of showing the amplitude of the received acoustic energy; and iii. a mud velocity and attenuation chamber between and in communication with said at least one transducer and receiver for measuring fluid acoustic energy transmission characteristics, including at least velocity and attenuation;

b. discriminating the receivers receiving the largest amplitude signals of reflected acoustic energy and thereby discriminating critical angles and therefore the compressional velocity and the shear wave velocity for the formation and displaying the compressional and shear wave velocities as function of depth; and c. calculating formation density for each shear wave velocity and compressional velocity and displaying the density as a function of depth.

* * * * *